United States Patent [19]

Salisbury

[11] 4,401,618
[45] Aug. 30, 1983

[54] PARTICLE-INDUCED THERMONUCLEAR FUSION

[75] Inventor: Winfield W. Salisbury, Scottsdale, Ariz.

[73] Assignee: Occidental Research Corporation, Irvine, Calif.

[21] Appl. No.: 24,314

[22] Filed: Mar. 27, 1979

Related U.S. Application Data

[63] Continuation-in-part of Ser. No. 712,487, Aug. 9, 1976, abandoned.

[51] Int. Cl.³ .............................................. G21B 1/00
[52] U.S. Cl. ................................... 376/106; 376/105; 376/128; 250/251
[58] Field of Search ......................................... 176/1-6, 176/9; 250/251; 376/105-107, 128

[56] References Cited

U.S. PATENT DOCUMENTS

| | | | |
|---|---|---|---|
| 3,094,474 | 6/1963 | Gale | 176/1 |
| 3,258,402 | 6/1966 | Farnsworth | 176/2 |
| 3,386,883 | 6/1968 | Farnsworth | 176/1 |
| 3,445,333 | 5/1969 | Lecomsti | 176/1 |
| 3,530,497 | 9/1970 | Hirsch et al. | 176/2 |
| 3,846,636 | 11/1974 | Zehr et al. | 250/251 |
| 3,859,164 | 1/1975 | Nowak | 176/2 |
| 3,899,681 | 8/1975 | Beckner et al. | |

FOREIGN PATENT DOCUMENTS

| | | | |
|---|---|---|---|
| 2440921 | 3/1976 | Fed. Rep. of Germany | 176/1 |
| 983753 | 2/1965 | United Kingdom | 176/1 |

OTHER PUBLICATIONS

Controlled Nuclear Fusion: Current Research and Potential Progress, National Academy of Sciences, Wash., D.C. 1978, pp. VII-VIII, 5-11, 14-16, 33-36.
ANS Trans., 6/77, pp. 9-11.
Physical Review Letters, 9/29/75, vol. 35, No. 13, pp. 848-851, Clauser.
Nuclear Fusion, vol. 10, 1970, pp. 211, 212, 222, Linhart.
ERDA-28-1/95, pp. 1-3, 8-10.
Technology Review, 12/76, pp. 20-24, 32-34, 39, 41-43.
Matt-1050, 12/74, pp. 526-529.
Nuclear Fusion 4/75, pp. 333-335, Kirkpatrick et al.

*Primary Examiner*—Harvey E. Behrend
*Attorney, Agent, or Firm*—Harris, Kern, Wallen & Tinsley

[57] ABSTRACT

A nuclear fusion process for igniting a nuclear fusion pellet in a manner similar to that proposed for laser beams uses, an array of pulsed high energy combined particle beams focused to bombard the pellet for isentropically compressing it to a Fermi-degenerate state by thermal blow-off and balanced beam momentum transfer. Each combined particle beam is arranged to produce electric charge neutrality in a volume around the target so that space charge induced expansion is avoided. Each high energy combined beam is produced by merging in neutralizing proportion a convergently focused stream of positive particles and at least one convergently focused stream of negative particles to form an electrically neutralized combined beam having a deBroglie wavelength focal pattern at the region of pellet collision. The momentum and fusible mass of the particle beams reduce the ablation loss and result in a larger fraction of the pellet being available for fusion reaction. Existing particle beam technology makes high energies and high production efficiencies feasible for reducing the power input and reactor size necessary for practical nuclear fusion power.

31 Claims, 20 Drawing Figures

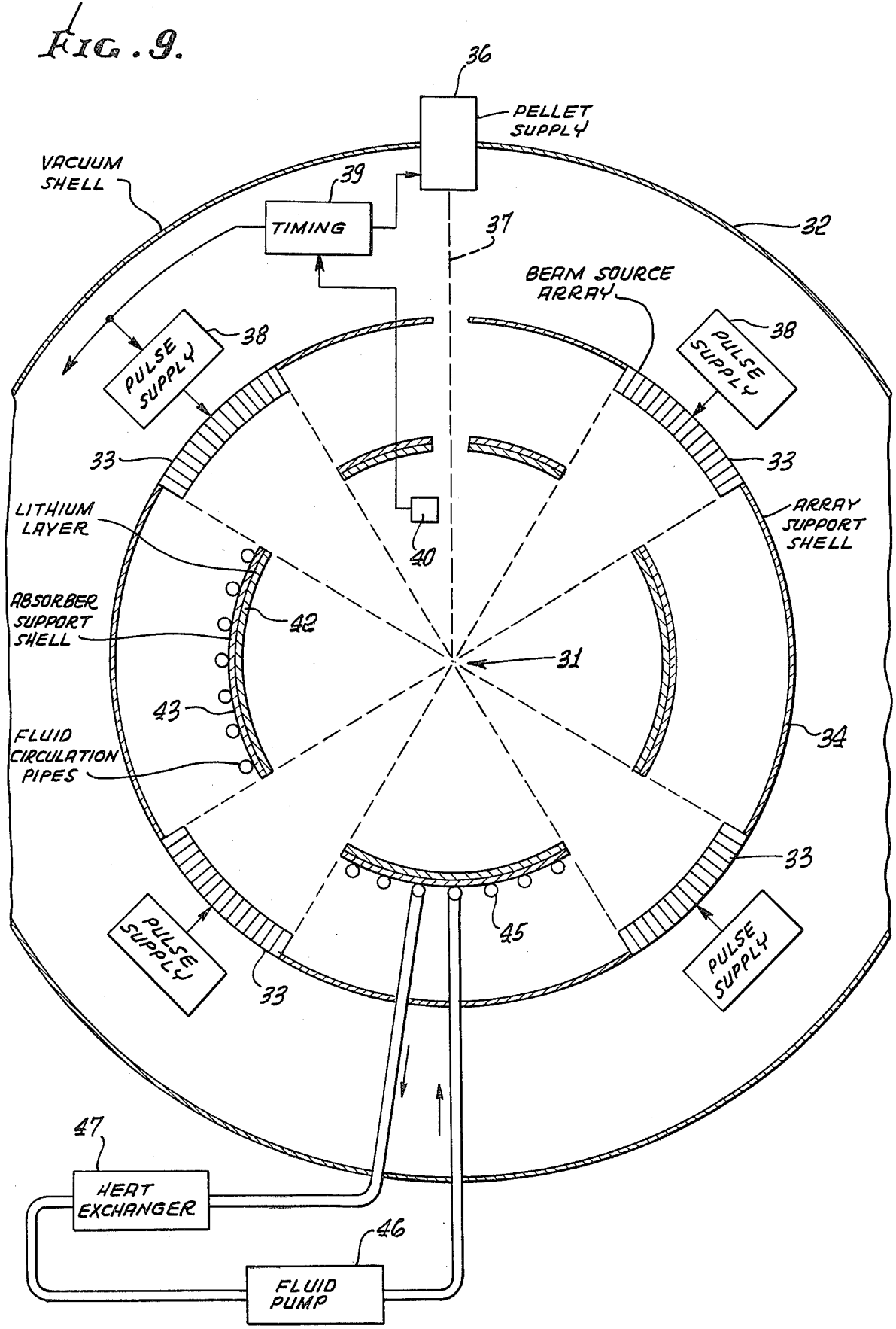

PARTICLE-INDUCED THERMONUCLEAR FUSION

CROSS-REFERENCE TO RELATED APPLICATION

This application is a continuation in part of copending application Ser. No. 712,487, filed Aug. 9, 1976, now abandoned.

BACKGROUND OF THE INVENTION

This invention relates to a nuclear fusion process for production of power and of neutrons by bombarding a pellet of fusible material with a plurality of pulsed high energy beams focused in balanced relationship to a region of pellet collision to isentropically compress the pellet to a Fermidegenerate state by thermal blow-off and balanced beam momentum transfer.

The central problem in developing a practical thermonuclear fusion process is that of raising a small mass of nuclearly fusible material such as ionized deuterium or a mixture of deuterium and tritium to the required reaction temperature and maintaining density and temperature long enough for a significant portion of the hot ionized gas to proceed with a nuclear reaction. The temperature required is so high (of the order of $10^8$ K.°) that no solid state matter can maintain mechanical integrity while in close contact with the reaction. It is necessary either to confine the reacting plasma with a magnetic field or to pulse the reaction so rapidly that inertial forces from rapidly moving high temperature gas can be used to provide the confinement forces for the very short time required.

There have been many attacks on these problems, some of which have produced partial success and great promise for future effectiveness. One of the methods of obtaining thermonuclear fusion under serious investigation at the present time, is laser induced fusion in which pulsed high energy laser beams are focused in balanced relationship to a target position to bombard a small pellet of deuterium-tritium mixture as the pellet traverses the target position. The laser beams are arranged so that part of the dense pellet is isentropically compressed to a high density Fermi-degenerate state by thermal blow-off and beam momentum transfer. Thermonuclear burn is initiated in the central region and propagates outward, igniting the dense fuel. Such a laser induced fusion system is discussed in *Review of Modern Physics*, Volume 47, No. 1, January, 1975 by F. L. Ribe.

Lasers capable of providing the required high energy beams to make fusion economically practical are under development, but the energy efficiency of such devices is only in a range of about 1-20% at the present time. In addition, a laser beam characteristically has a relatively small momentum available for pellet implosion thereby requiring relatively higher power sources in the case of laser beams.

Relative to laser technology, particle beam technology is an old and well developed art offering several advantages not currently available with lasers. The most important of these is that electron and ion beams can be produced at 80-90% energy efficiency. Additional advantages offered by particle beams are short wave lengths, high momentum and additional fusible mass free from contaminants. The momentum and fusible mass of particle beams if used for bombarding a pellet could reduce the ablation loss and result in leaving a larger fraction of the pellet available for the fusion reaction. Inspite of the numerous known advantages already available in particle beam technology, it has not previously been employed for delivering energy for igniting a nuclear fusion pellet, probably because of the difficulty in focusing a dense beam of charged particles of one sign in order to achieve the requisite control and symmetry in the pellet collision and imploding pressure. One approach to particle beam fusion is described in Hirsch U.S. Pat. No. 3,530,036, but it is limited by reason of space charge induced expansion.

It has been proposed that charged particle beams can be neutralized by including a quantity of a gas at the reaction space, and this procedure is sometimes referred to as "gas neutralization". In the gas neutralization process, the particles of the beam produce ionization of the gas, and for a positively charged particle beam, the resultant electrons will to some degree neutralize the charged particles. However, this leaves the positive gas ions which also require neutralization. Also, the electrons from the ionization tend to overshoot in the beam producing oscillation and instability.

It is an object of the present invention to provide a new and improved process and apparatus which overcomes the disadvantages of the prior processes and apparatus.

SUMMARY OF THE INVENTION

The success of the invention depends upon the generation and focusing of short pulse heavy particle beams of high particle density and energy having a focal pattern and resolution that is not limited by space charged induced expansion.

The invention is primarily concerned with providing a nuclear fusion process comprising producing a collision of combined positively and negatively charged particle beams in a reaction space, each combined beam including fusible particles and each combined beam being proportioned to be essentially electrically neutral in the reaction space.

The invention also has application as a process for producing high temperatures and/or as a process for effecting release of neutrons.

More particularly, and in accordance with the invention, each combined high energy beam is produced by merging in neutralizing proportion a convergently focused stream of fusible positive particles with a convergently focused stream of negative particles to form an electrically neutralized combined beam having a focal region in a volume around the reaction space.

As described herein, two or more such space charge neutralized high energy combined positively and negatively charged particle beams strike the pellet at the same time and in such a manner that their balanced momentum produces symmetrical imploding pressure on the pellet and does not produce motion of the pellet as a whole. The merging streams are focused to achieve an electrically neutralized combined beam in advance of the focal region so that space charge is not the controlling element in the size of the focal region. Thus, the beam merger neutralizes the space charge in the region of the pellet during compression and nuclear burning. This neutralization of space charge allows the limit of focal resolution of the beams on the pellet to be controlled by the deBroglie wavelengths of the particles so that the focal resolution is similar to that in an electron microscope. The merging streams can then be adjusted to merge and defocus appropriately to enable precise control and adjustment as required for achieving uniform compression of the pellet and for applying appropriate heating energy for initiating thermonuclear reactions. The high focal resolution made possible by the composite beam system of this invention permits known beam techniques for timing, pulse shaping and pulse duration to be adjustably controlled with great precision for achieving substantially complete nuclear reaction of the mixture in the target pellet.

Generally, the invention contemplates the use of accurately focused combined beams by merging a positive particle pulsed stream in neutralizing proportion with a negative particle pulsed stream (either electrons or negative heavy ions). In one of the illustrated embodiments where electrons are used for the negative particle stream, the electron wavelength is considerably greater than that of the heavy and more energetic positive ions. The electron wavelength then becomes the controlling factor in determining the ultimate minimum size of an achievable focal area. Even this electron wavelength is so small that appropriate defocusing can be used to match incoming combined particle beam size to the target pellet region.

In such embodiment, each combined beam consists of one stream of positive ions traversing a first path of hollow conical profile that defines a positive ion focus in a volume around the reaction space, an outer electron stream traversing a second path of hollow conical profile that defines an electron focus before reaching the positive ion focus to merge with the positive ion stream before reaching the volume around the reaction space and an inner electron stream traversing a third path of conical profile that defines an electron focus beyond the positive ion focus to merge with the positive ion stream before reaching the volume around the reaction space.

In other embodiments, line beam sources are arrayed alternately positive and negative in parallel or radial arrays, and focused to the reaction space for blending of the individual beams to produce the combined neutral beam. The beams are pulsed and the particle pulses are compressed during transit to increase the particle density at the reaction space.

In the preferred embodiment, the pulsed particle beams are compressed in time while traveling from the sources to the reaction space to increase the energy and momentum of the particles impacting the target. Also the positive and negative beams preferably are generated and controlled so that the positive and negative particles travel at substantially the same velocity and with substantially the same velocity profile during compression.

Also the sources produce particle beams which are ballistically focused and which are relatively thin thereby reducing defocusing during transit to the target.

Other features and advantages of the invention will be apparent from the following description and claims, and are illustrated in the accompanying drawings which show structure embodying features of the present invention and the principles thereof.

BRIEF DESCRIPTION OF THE DRAWINGS

In the accompanying drawings forming a part of the specification, and in which like numerals are employed to designate like parts throughout the same:

FIG. 9 is a diagrammatic illustration of fusion apparatus incorporating an alternative and presently preferred embodiment of the invention;

DESCRIPTION OF PREFERRED EMBODIMENT PELLET

Figure 1:
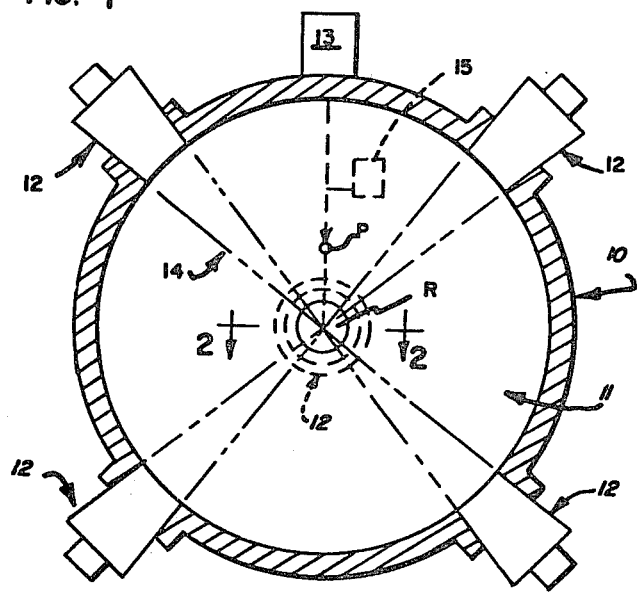
FIG. 1 is a diagrammatic illustration of the general arrangement of one embodiment of the invention.

Primarily fusion energy is released by heating a suitable pellet of fusible material, or a pellet containing sufficient fusible material, to a temperature at which nuclear fusion can take place in a sufficiently short time so that inertial confinement due to incoming momentum and outer layer expansion can increase and maintain the density necessary to produce a nuclear micro-explosion.

In this process the heat is introduced by a well focused bombardment from several directions by ions of elements suitable for entering into the fusion reaction. The use of ion beams for heating provides a high input of inwardly directed momentum for compression and inertial confinement as well as the necessary input of energy for direct heating of the target-pellet material.

The duration required for this bombardment should be limited to about one to ten nanoseconds due to the expansion rate achieved when the pellet reaches the $10^8$ K. temperature necessary to produce an efficient fusion energy release. The energy input required during this pulse ranging from several hundred to several thousand joules depending on pellet size and other details of pellet construction is such that both spacial focusing and time compression of the bombarding ions are desirable to produce the required rates of energy input and energy density per unit area at the pellet-target. Also, area compression of the beam is required because of the present practical limits of ion current density available from focusable ion sources.

An important design parameter of a controllable fusion system is the size of the micro-explosion produced from each pellet, since the ratio of efficient fusion energy release to the required initiation energy places a limit on the efficiency of energy release. A small ignition energy and a small pellet is necessarily associated with a managably small energy release. The complexity and cost of the ignition system favors a small pellet and a small system such as can be used in a precision system.

The pellet size and density also limits the energy of the ignition beam particles since each bombarding ion should be stopped in the pellet in order to transfer its energy usefully to produce ignition temperature. Energy release per micro-explosion is most conveniently limited to a few pounds of TNT equivalent energy for each energy release. This is desirable in order to limit the scavenging problem between explosions for power plant design and in order to allow the design of power plants in the power range (a few hundred megawatts per power plant) most acceptable by and desirable for the public utility industry.

These considerations limit the size of a pellet to less than one mm diameter.

The target pellet which is to be bombarded by the accelerated particle beams is composed of any nuclearly fusible mixture. Examples of nuclearly fusible mixtures are deuterium ($H^2$) and tritium ($H^3$), deuterium ($H^2$) and helium ($He^3$), tritium ($T^3$) and helium ($He^3$), pure deuterium, lithium ($Li^7$) and hydrogen, lithium ($Li^6$) and deuterium, and others. The pellet may be a liquid or solid sphere, or spherical shell of the nuclearly fusible mixture. The optimum radius and density of the small spherical pellets will depend on the design of the reactor, the accelerating voltage of the beams, the beam and pellet elementary constituents and the output energy desired. The pellet must contain enough mass to absorb the incident heavy ions and a reasonable portion of the reaction generated charged particles, which, for example, will be alpha particles from a deuterium-tritium reaction. A frozen deuterium-tritium pellet presently is preferred.

REACTION CHAMBER

Referring now to the drawings, and particularly to FIG. 1, an illustrative embodiment of a nuclear fusion reactor in accordance with this invention as shown diagrammatically, consists of a reaction chamber 10, shown here as being of spherical form, providing an evacuated space 11 and an array of compound charged particle sources 12 disposed outside of the reaction chamber 10. The dense pellet P of fusible material is injected from a pellet source 13 shown at the top of the reaction chamber to traverse a path which crosses a center target region or reaction space R in the reaction chamber. Each of the charged particle sources 12 generate and accelerate pulsed high energy combined positively and negatively charged particle beams 14 that enter through apertures in the reaction chamber to converge towards the target position R. For purposes of disclosure, there are six combined beams shown in FIG. 1 that bombard the pellet by simultaneously striking it when it reaches the target position R, the six combined beams being arranged in a symmetrical balanced configuration for minimal transverse momentum transfer to the pellet. Where only two beams are used, the combined beams are arranged to enter the sphere on opposite ends of a diameter to achieve momentum transfer balance.

Although the illustrative embodiment contemplates six combined beams, any greater or lesser number (other than one) may be used providing the beams are positioned to produce reasonably uniform heating and momentum transfer, both from the direct beams and from ablation of the heated pellet material.

The focal regions of all of the combined beams 14 are at the target position to enable the accelerated particle beams to strike the falling pellet as it traverses the central target position. As a refinement in insuring accurate synchronization of the beam and pellet intersections, a laser means 15 is provided for sensing the relatively slowly moving pellet P and generating an optical response that times the triggering of each of the charged particle sources 12. The interval between the sensing of the pellet and the triggering of the sources 12 must account for the transit times of the pellet and the beams to the target position and also for the time for the triggering signals to pass through their generating means and control circuits.

In the illustrated embodiment, the reaction chamber 10 is a sphere three meters in radius and the compound charged particle sources are schematically represented as being located externally of the reaction chamber and on surfaces which are geometrically parts of spheres concentric with the reaction chamber and typically, about 4 meters in radius. The distance between the sources and the reaction chamber must be sufficient to allow room for use of large source areas, high accelerating voltage equipment, focusing equipment and if desired, differential vacuum pumping equipment.

In accordance with this invention, each of the combined beams is formed by merger of streams of negatively charged particles and positively charged particles. The charged particle streams must arrive in the vicinity of the target position at the same time to avoid space charge expansion by creating a combined beam having an electrically neutral resultant in a volume around the pellet. A neutralized combined beam can be achieved by using positive and negative particle streams of the same velocity, starting radius and time or by a combination of appropriate sets of geometry, velocity and timing.

Figure 2:
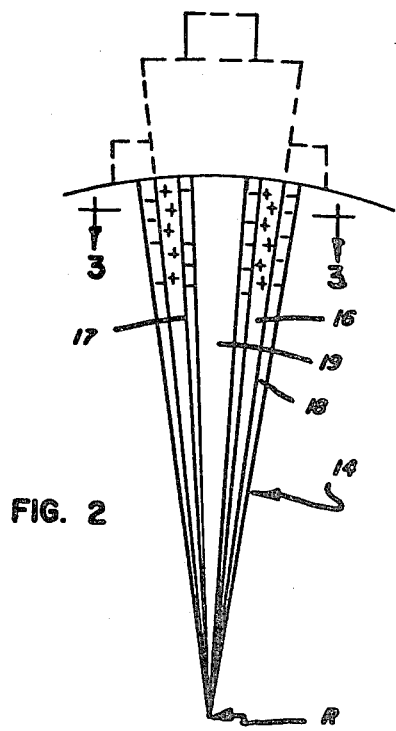
FIG. 2 is a radial section taken approximately as indicated at 2—2 on FIG. 1 through a combined beam perpendicular to the drawing and illustrating one of the preferred compound particle source arrangements for providing a combined positively and negatively charged particle beam in accordance with the invention.

As shown in FIG. 2, for one of the preferred embodiments, the combined particle beam is formed by appropriate merger of a stream 16 in the form of a hollow cone of positively charged particles surrounded on the outside by a stream 18 in the form of a thin hollow cone of negatively charged particles and having on the inside a stream 17 in the form of a solid or another hollow cone of negatively charged particles.

For the illustrated arrangement, the vertexes of all of the cones are near the center of the sphere. The precise focal pattern is subject to variation and adjustment, providing that charge neutralization which is critical only in a volume around the pellet is achieved by fully merging the streams into a combined beam before reaching the immediate vicinity of the target.

With further reference to the cone arrangements illustrated in FIG. 2 and considering the positive ion stream 16 to consist of deuterons of 2 Mev energy and the negative streams 17, 18 to be electrons of the same velocity, the energy ratio for the equal velocity relationship is given by $2 \text{ Mev} \times m_0/M_0 = 544$ ev (where $m_0$ and $M_0$ are respectively the rest masses of an electron and a deuteron).

For the particle beams shown in FIG. 1, both temporal focusing (phase bunching) as well as spacial focusing can be employed for increasing the energy density of the pulse at the point and time of collision with the pellet as compared with the energy density of the pulse at the beam sources. See Temporal Focusing or Phase Bunching hereinbelow. In particular, phase focusing can be used to shape the increase of the beam momentum pressure during the pulse so that evaporation losses from the pellet are minimized.

The art of electron and ion sources is well developed in connection with particle accelerators and mass spectrograph isotope separators and is therefore readily adaptable to the requirements for producing merging streams of positive and negative particles as described herein. Typical components utilizing such developed art are therefore shown only schematically here as the equipment and techniques are already widely known and used by those skilled in the art.

The ultimate limit to which the size of the focal point of particle beams may be reduced depends upon the "f" number of the optical system and the deBroglie wavelengths of the particles or electrons. For the example considered here, the positive particles are a stream of deuterons of 2 Mev energy and the negative particles are electrons of the same velocity. Calculations on this basis show that the ultimate focal spot size is much smaller than the pellet size. Of course particles of other energy levels may be used and energies as low as 50 kev and lower may be employed. The deBroglie wavelength of 2 Mev deuteron is $1.4 \times 10^{-12}$ cm. and of electrons of the same velocity is $5.2 \times 10^{-9}$ cm. For any reasonable "f" number, say 20, the focal spot size, $10^{-7}$ cm., is very much smaller than the pellet sizes of $10^{-3}$ to $10^{-2}$ cm.

The positive particle and negative particle streams must be merged to eliminate the effects of space charge expansion in a volume around the target. This can be done in several ways. For example, the electron streams on either side of the hollow cone of positive ions can be brought to a focus on either side of the focus of the positive ions; the outer electron, cone 18 being brought to a focus inside, and the inner electron cone 17 being brought to a focus outside of the positive ion focus. As the electron streams 17, 18 cross the positive ion stream 16, the electrostatic forces between the oppositvely charged particles will allow the momentum of the heavy positive ions to keep the electrons in the positive ion cone. The loss of electrons by collisions from the beam can be compensated for by increasing the original electron beam current.

COMPOUND PARTICLE SOURCES

Figure 3:
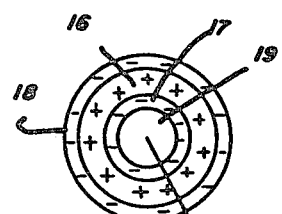
FIG. 3 is a spherical projection, substantially to scale, of a compound ion-electron source configuration to show the projected conical area relationships of the individual particle sources and is taken as indicated at 3—3 on FIG. 2.

In Beam Current and Energy hereinbelow, it is shown that the required currents could be obtained with reasonable densities from a total source of the order of 5% of the area of a reference sphere of 4 m. radius. For three mutually perpendicular pairs of particle beams with a total of six compound sources, as shown in FIG. 1, each such compound source would occupy approximately 1% of the surface area of the sphere. The proportions of an example of such a source (source 1) relative to the reference sphere RS of radius R' are shown viewed in polar projection in FIG. 3. In this compound source of total area A, the area is divided into annular segments such that:

positive ion beam area $16 = 0.4A$
inner electron beam area $17 = 0.2A$
outer electron beam area $18 = 0.2A$
inner non-emitting area $19 = 0.2A$.

The ion and electron sources need not be on the surface of the same reference sphere. In general, it will be more convenient to have the positive ion source with its high voltages, and possibly heavy magnets, at a larger distance from the reactor center than the outer electron beam source, as is indicated diagrammatically in FIG. 2. For the arrangement indicated in FIGS. 1 and 2, the radial dimensions for the sources for the case where the reactor sphere is of 3 m. radius are as follows:

Radius of source of positive ion stream $16 = 4$ m.
Radius of source of inner electron stream $17 = 4.3$ m.
Radius of source of outer electron stream $18 = 3.7$ m.
If the beams have no secondary focus and if the angles are preserved, the polar projection would still be that of FIG. 2.

THE POSITIVE ION SOURCE

The positive ions may be ions taking part in the thermonuclear fusion reaction or they may be heavier ions used to compress and to heat the fusion pellet, but not to take part in the thermonuclear fusion reaction. For purposes of illustrative disclosure, deuterons are used as the example of the positive ions.

Several techniques and combinations of techniques are available to focus the deuteron stream and two examples of such techniques are described in the following sections:

(a) Simple lens focusing
(b) Compound lens focusing

The features of the ion source construction discussed under the section on simple lens focusing apply as well in cases of electrostatic and magnetic focusing. Simple lens focusing might be likened to the focusing of light by a single convex lens. Compound lens focusing as described herein might be likened to the focusing of a telephoto lens in which one accelerating grid has the role of the diverging lens of a compound telephoto lens.

The illustrative example of the positive ion stream disclosed herein is a hollow cone of ions focused at the center R of the confocal reference spheres for the ion source and the reactor.

Figure 4:
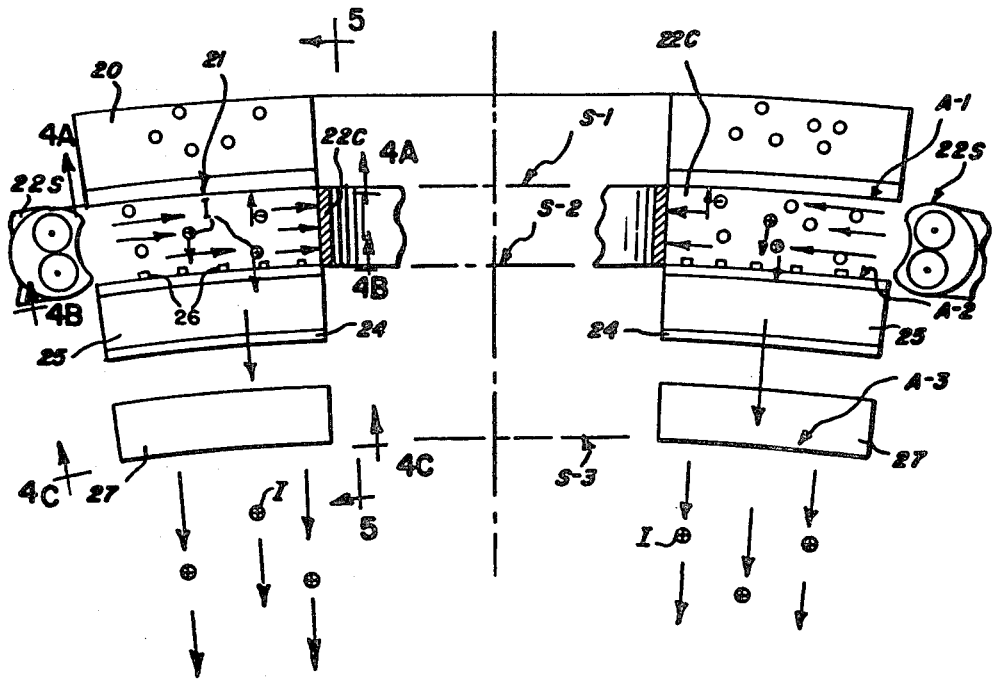
FIG. 4 is a radial section showing the configuration of elements used in a positive ion source arrangement utilizing simple lens focusing and FIGS. 4A, 4B and 4C are detailed sectional views of the source elements taken as indicated on FIG. 4.
Figure 4A:
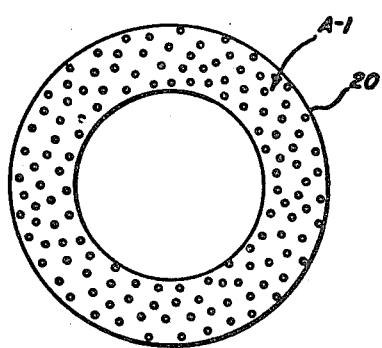
Figure 4B:
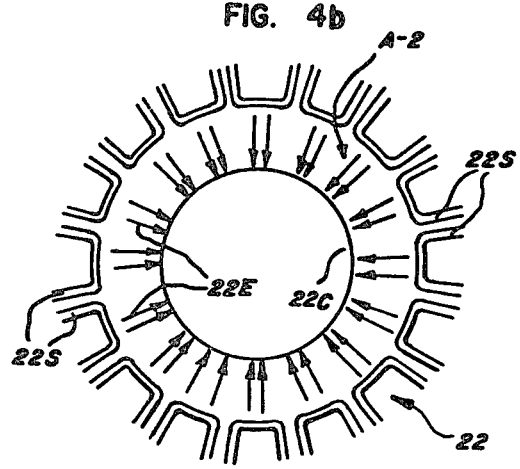
Figure 4C:
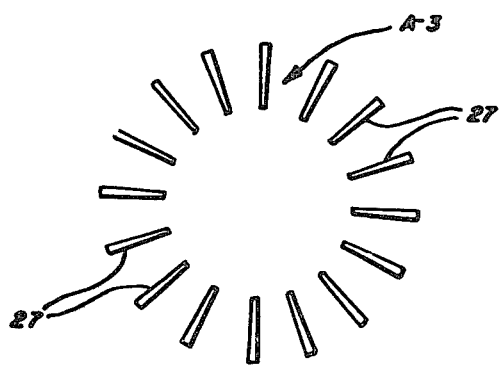

The positive ion source can be visualized as composed of superimposed annular zones A-1, A-2 and A-3 (see FIGS. 4A, 4B and 4C) on the surfaces of confocal reference spheres, that are represented in phantom lines designated S-1, S-2 and S-3 in FIG. 4. The superimposed annular zones A-1, A-2, A-3 subtend the same solid angle at the center of the spheres.

The anode 20 of the ion source occupies the annular zone A-1 on the outer reference sphere S-1. The anode as indicated in in FIGS. 4 and 4A may have machined openings for the gas inlet or may be of porous material such as spongy tungsten. The neutral deuterium gas enters the system exterior to the anode and passes through openings in the anode into the annular ionizing chamber 21 which comprises the annular zone A-2 on the middle reference sphere S-2.

The circular ionizing electron source 22 sourrounds the annular ionizing chamber 21 where the ionization of the deuterium gas takes place. The circular electron source 22 is composed of an annular array of identical segments 22 S, each producing electrons which flow on the surface of the middle reference sphere S-2 to traverse the annular zone A-2 from the larger circular periphery to the smaller circular periphery, as shown by the arrows 22 E in FIGS. 4 and 4B. The flow of electrons across the zone A-2 ionizes the deuterium gas just radially exterior to the annular region occupied by an annular array of grid bars. The collector for these transversely flowing ionizing electrons could be, for example, a circular bar 22 C of cooled copper bordering the inner circular periphery of the ionizing chamber 21.

Figure 6:
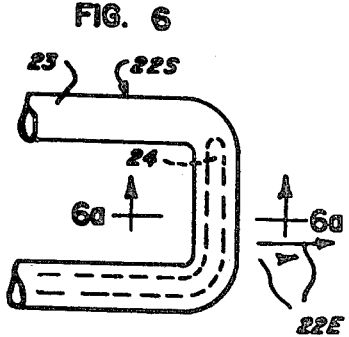
FIG. 6 is an enlarged fragmentary view of the ionizing electron source used in the positive ion source as shown in FIG. 4B.
Figure 6A:
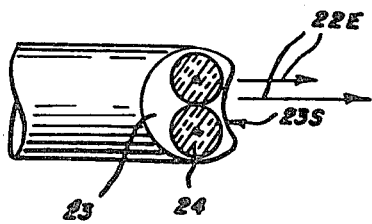
FIG. 6A is a detailed section taken as indicated at 6A—6A on FIG. 6.

Each segment 22 S of the electron source (see FIGS. 6 and 6A) in this example is composed of tubing 23 of Ni containing Al or C needed to reduce the oxide coating. The side 23 S of the tubing from which the electrons are emitted as indicated by arrows 22 E is preferably concave and coated with oxide as shown in FIG. 6A. The heater wire 24 inside the tubing is coated with insulation—for example, with ceramic—and enters the tubing through one end, passes through the emitter region, turns back on itself and exits from the emitter region of the tubing through the entrance. This looping of the heater wire, reduces the magnetic field produced by the heater current to a tolerable value.

In summary, neutral deuterium gas enters the annular zone A-1 and moves through the anode openings to be ionized by the electrons 22 E emitted from the heated segments 22 S and flowing across the annular zone A-2, thus producing an annularly distributed source of deuterium ions I that are to be accelerated radially inward to a focus at the target location. When each deuterium ion I is formed, a corresponding electron is formed and is attracted to the anode 20. The unused electrons of the ionizing stream are collected on the circular ring 22 C.

SIMPLE LENS FOCUSING

Figure 5:
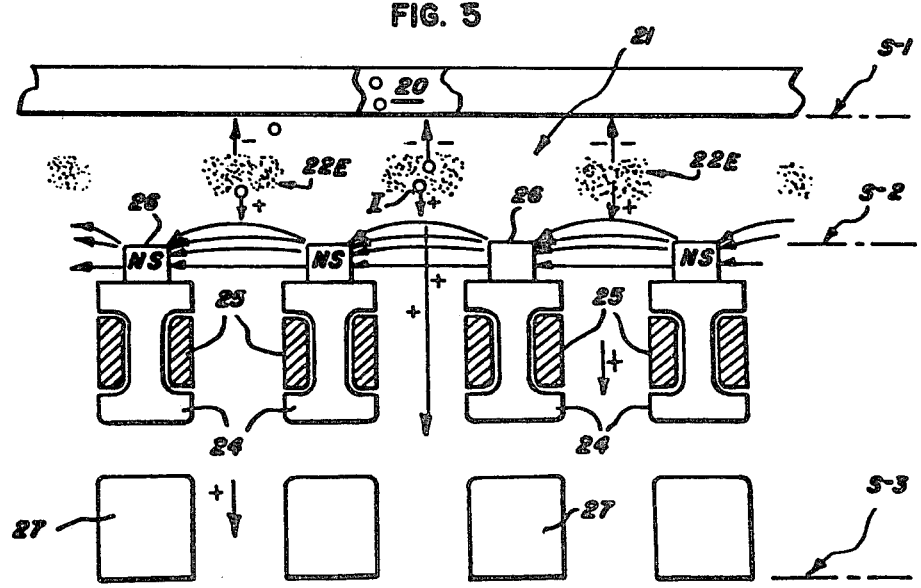
FIG. 5 is a diagrammatic view taken as indicated on the line 5—5 of FIG. 4 and further illustrating the configuration and operation of the simple lens type positive ion source.

To produce and control radial acceleration of the positive deuterium ions, a simple lens type electrostatic grid system having a focusing grid, control grid and accelerating grid as shown in FIGS. 4 and 5 is employed. Each such grid in effect is a separate annular array of grid bars, with each grid bar extending from the larger circular periphery to the smaller circular periphery of the annular zone occupied by the array.

In the particular grid system construction illustrated in FIG. 5, the bars 24 that comprise the focusing grid are I-shaped in cross-section to provide convenient mounting of the pairs of bars 25 that comprise the control grid. A set of magnets 26 polarized as shown in FIG. 5 are supported on the outer faces of the focusing grid bars 24 to provide magnetic fields transverse to the direction of flow of the ionizing electrons and produce curvature of the electron flow corresponding to the curvature of the corresponding reference sphere S-2.

The bars 27 that comprise the accelerating grid may be of rectangular section and have a lengthwise curvature corresponding to the curvature of the corresponding reference sphere S-3 which is of smaller radius and confocal with the ion source reference sphere in order to produce the desired radial acceleration of the deuterium ions. The accelerator grid bars 27 may be of cooled CrCu alloy.

The voltage and current pulse sources for energy supply and control of the positive ion stream may utilize contemporary principles of practical pulsers. For example, a triggered spark-gap marx circuit can be utilized to give either square voltage pulses or shaped pulses for high voltage and high current. More specifically, short sections of uniform coaxial transmission line, such as R.G. 19U can be charged to 200 K.V. to give to a properly matched load a 100 K.V. pulse lasting for twice the time required for the voltage wavefront to traverse the line section once. Thus, a one foot section of 50Ω line will give a square voltage pulse into a 50 ohm load. The width of the pulse will be approximately $2 \times 10^{-9} \times \sqrt{k}$, where k is the relative dielectric constant of the line insulation. Standard RG 19U cable has a $k=2.4$, so $\Delta t = 3 \times 10^{-9}$ sec., and $I = 100,000/50 = 2000$ amperes.

Twenty of these elements charged in parallel and discharged in series will produce a square wave pulse of 2 million volts (2 MV) and 2000 amperes.

Six of these units producing six converging beams opposed by pairs will produce a current of 12,000 amperes lasting 3 nanoseconds.

The spark and triggers are preferably supplied from a single source with equal length lines so that their filter time will depend principally on the time for the ultraviolet light from the trigger spark to cross the control gap. This gap in each case has to hold off 200 K.V. and can therefore be about 2 cms. in pressurized gas. The triggering time is thus about 0.06 nanoseconds. The photo electron avalanche return in the triggered gap will be somewhat slower, typically about 0.1 nanoseconds. The jitter time will be less than this, probably about one-tenth at a maximum, so that the pulse timing can be of the order of 0.016 nanoseconds maximum. Improvement of this can be accomplished by the introduction of radioactive ionization sustainers in the trigger gaps. Thus, standard engineering can provide timing of adequate accuracy.

Pulse shaping can be produced by the use of nonlinear transmission lines for the charge storage and pulse shape control on the electron and ion source control grids.

Recharging can be produced at 100 pulses per second rates and possibly at 1000 pulses per second rates, as these represent very large intervals between pulses compared to the pulse duration. Radar and laser pulsing experience indicates reasonable design criteria and a store of practical engineering experience.

ION SOURCE OPERATION

The ion optic system illustrated herein is based on the particle-optic principles used in electron microscopes and in high power beam focused electron tubes. The control grid 25 is an example of the shielding grid design used to minimize current losses to the control grid, especially at the peak acceleration voltage on the control grid which produces the maximum current from the particle source. While the disclosure only illustrates the positive ion source, the techniques are also applicable to the electron source provided the sign of the grid potential differences from the surrounding shield is appropriate to the sign of the particle being accelerated.

Figure 7A:
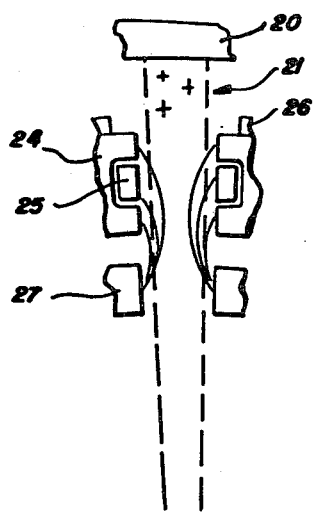
FIGS. 7A and 7B, respectively, show the electrical operating states for control grid "closed" and "open" for the FIGS. 4 and 5 grid arrangement.
Figure 7B:
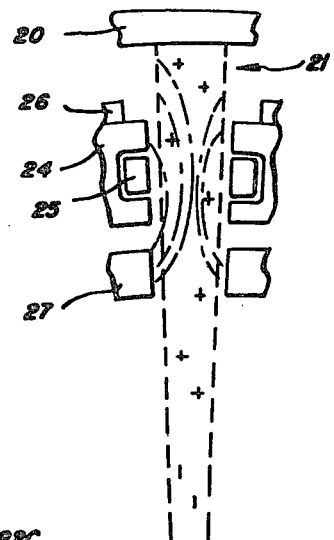

By way of example and with reference to FIGS. 7A and 7B, the typical voltage applied to both the anode 20 and focusing grid 24 is 2 MV while the accelerator grid 27 is at 0 V.

As shown in FIG. 7A, when the voltage applied to the control grid 24 is (2 MV+100 V.) such that the potential difference between the control grid 25 and the anode surface has the sign opposite to the potential difference between the accelerating grid 27 and the anode 20, then the electric flux lines from the accelerator grid 27 terminate on the control grid 25 and the gate is closed to produce zero ion current.

Alternately, as shown in FIG. 7B, when the voltage applied to the control grid 25 is (2 MV−1 KV), such that the potential differences between the grids and the anode surface have the same sign, the electric flux lines from the accelerator grid 27 terminate on the anode and the grid gate is fully open.

Such a gate grid is required so that a short delay in the control grid gate opening voltage can be provided to allow the accelerating voltages to rise to full value before the ion beam is formed. This action minimizes the losses due to unfocused ions and wasted acceleration pulse power. Since the timing of the particle pulse is controlled by the control grid opening, this timing is easily given the required precision because only a relatively small change in voltage is required for control.

COMPOUND LENS FOCUSING

Figure 8:
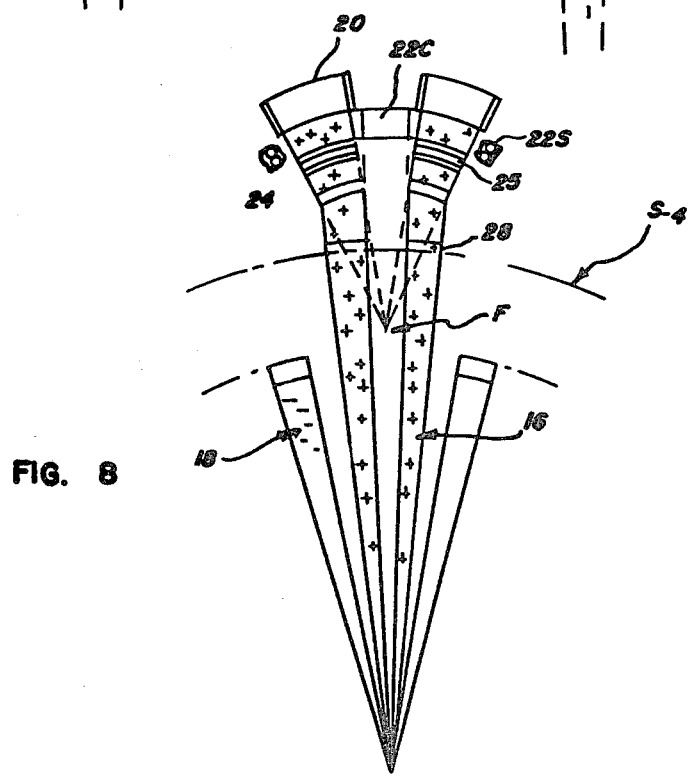
FIG. 8 is a diagrammatic view like that of FIG. 4, but showing a compound ion-electron source incorporating compound lens focusing.

A compound source arrangement for producing a combined beam comprised of a hollow cone of positive ions surrounded only on the outside by a hollow cone of electrons is shown in FIG. 8. The positive ion source lies at a greater distance from the reactor center than the electron source to allow for greater convenience in the placing of the focusing and accelerator grids. In this example, the positive ion source incorporates a compound lens system including the same elements 20, 22 S, 24, 25, 26 and 27 as previously described.

In this arrangement, the intermediate accelerator grid 27 typically has an applied voltage of 1.5 MV and the elements 20, 22 S, 23, 24, 25 and 26 as well as the intermediate grid 27 follow the curvatures of a shorter radius reference spheres to define substantially a virtual focus as shown at F for the positive ions.

A second final accelerator grid 28 following the curvature of a reference sphere S-4 centered on the reactor center and having an applied voltage of 0 V supplies final acceleration to extend the focal point of the positive ion beam to the target region.

The compound lens system of FIG. 8 allows the beams to enter the reactor shield through smaller openings than is possible with simple geometric focusing.

The positive ion beam also may be focused by the use of magnetic quadrupole lenses such as are illustrated in the Livingood reference (7).

THE IMPLOSION AND FUSION REACTION

Thermonuclear fusion induced in a D-T pellet by combined particle beams will resemble, in many features, that induced by laser beams. The use of space-charge neutralized ion beams will overcome many difficulties previously discussed. (2) While the average energy per particle in the bombarded pellet would be 0.7 ev according to reference (2), the calculations in Source Current Density hereinbelow show that average energy per particle in the bombarded pellet would be from 3.0 to 30 kev, for the presently proposed method. To achieve practical laser-induced fusion, the solid or liquid pellet must be compressed by a factor of 1000 to 10,000. (3) The pressure required for this compression is of the order of $10^{11}$ (5), of $10^{12}$ (4) atmospheres. For laser fusion, this pressure is produced largely by the high temperature atmosphere of material ablated from the pellet surface. For a pellet with an initial radius of 0.01 cm. and a compression factor of 1000, the pressure of a well-focused space-charge neutralized beam could increase to $10^9$ atmospheres. For the very high current $10^5$ amperes, the final pressure from the beam could be as high as $10^{11}$ atmospheres. In addition, there will also be pressure from the ablated pellet-surface material.

The total input energy for a $10^{-8}$ sec. pulse with a current of $10^4$ amperes of 2 Mev deuterons would be:

$$10^4 \times 2 \times 10^6 \times 10^{-8} = 200 \text{ joules},$$

(or for a current of $10^5$ amperes, 2000 joules).

The output energy for the complete burn of a pellet with an initial radius of 0.01 cm. and density of 0.21 gm/cm$^3$ of D-T would be:

$$(4/3)\pi \times (0.01)^3 \times 4.7/2 \times 10^{22} \times 17.6 \times 10^6 \times 1.6 \times 10^{-19} \text{ joules} = 2.8 \times 10^5 \text{ joules},$$

at 5% burn efficiency, this is = 14k joules.

These numbers show a gain factor of 70 if the smaller current produces the "burn", or of 7 for the higher current.

These calculations indicate the feasibility of producing deuterium-tritium fusion induced in a pellet of fusible material by bombardment with focused beams of space-charge neutralized deuterons or tritons.

LITHIUM ION BEAMS

Because of the relatively high condensation temperature of lithium metal, lithium ions may be equal in effectiveness to deuterium or tritium as a bombarding beam material. The metallic nature of lithium is useful in the design of high current on sources because a relatively small amount of cryogenic condensation will allow a very high pressure of lithium in the immediate interior of the ion source without disturbing the vacuum, or requiring fast differential pumping in the beam space. In addition, the added mass of lithium particles contributes to the pressure effect on the pellet.

TEMPORAL FOCUSING OR PHASE BUNCHING

Temporal focusing, or phase bunching, can be accomplished by increasing the accelerating voltages for the positive ion and negative ion or electron beams during the voltage pulse. The shape of the beam pulse as it strikes the pellet will depend not only on the shape of the accelerating voltage pulse, but also on the velocities of the ions, the length L from the accelerating grid to the pellet, the desired length of the final pulse, and the geometric focusing.

Assume a 2 Mev deuteron pulse with a velocity $v_o = 1.4 \times 10^9$ cm/sec. emitted for the initial pulse time $10^{-8}$ sec. The initial pulse length will then be $S_o = 14$ cm. If a compression of the pulse time to $10^{-10}$ sec. and pulse length to $S = 0.14$ cm. is desired, the velocities of the ions emitted during the initial pulse must increase along the pulse to a velocity v. The velocity v, for a given L, can be found from the relation:

$$\frac{L}{v_o} = \frac{L + S_o - S}{v}$$

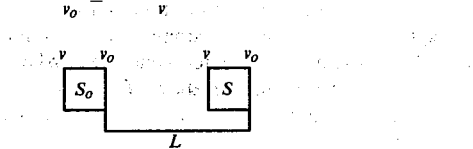

For L=400 cm:

$$\frac{v}{1.4 \times 10^9} = 1 + \frac{14 - .14}{400}$$

$$v = 1.03465 \times 1.4 \times 10^9$$

$$v^2 = 1.07 \, v_0^2$$

That is an increase in the accelerating voltage during the initial pulse of 7% will compress the pulse to $10^{-10}$ sec. after it travels 400 cm. If L is shortened to 399 cm. the pulse length will be increased by 10%. For distances longer than L=400, the required voltage rise to compress the pulse to $10^{-10}$ sec. will, of course, be less.

If the effects of space-charge at high compression are well compensated, the length of the path required for the fast ions and electrons to overtake the slow ones and again form a $10^{-10}$ sec. pulse can be found:

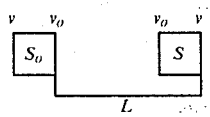

$$\frac{L + S_0}{v} = \frac{L - S}{v_0}$$

$$\frac{v_0}{v} = \frac{L - S}{L + S_0} = \frac{1}{1.03465} = \frac{L - .14}{L + 14}$$

$$14 = .03465 L - .14 \times 1.03465$$

$$L = \frac{.14 \times 1.03465 + 14}{.03465}$$

$$= 408 \text{ cm.}$$

BEAM CURRENT AND ENERGY

Consider, for example, a beam of 2 Mev. deuterons with a current of $I = 10^4$ amperes emitted during a pulse of $10^{-8}$ seconds. The number of deuterons in the pulse is:

$$\frac{10^4 \text{ amp.} \times 10^{-8} \text{ sec.}}{1.6 \times 10^{-19} \text{ coul.}} = 6.3 \times 10^{14}$$

A solid mixture of D-T with a density of 0.21 gm/cm³ (3) and average atomic wieght 2.5 contains:

$$0.21 \times \frac{6.0 \times 10^{23}}{2.5} = 5.0 \times 10^{22} \text{ atoms/cm}^3$$

that is, including electrons also, $10^{23}$ particles/cm³. A pellet of radius 0.01 cm. and volume $4.2 \times 10^{-6}$ cm³ contains $4.2 \times 10^{17}$ particles. The impinging deuterons each carry $2 \times 10^6$ ev. energy and this beam energy shared among the particles of the pellet gives an average energy per particle of:

$$\frac{6.3 \times 10^{14} \times 2 \times 10^6}{4.2 \times 10^{17}} = 3.0 \times 10^3 \text{ ev. per particle.}$$

A higher beam current of $I = 10^5$ amperes will raise this average energy to 30. kev. per particle.

The use of high energy, space-charge neutralized beams of deuterons (or tritons) can thus produce average energies greater than 10 kev. per particle in a fusion pellet.

BEAM MOMENTUM AND PRESSURE

A pulse of $6.3 \times 10^{14}$ deuterons ($I = 10^4$ amps for $10^{-8}$ sec.) of mass $3.3 \times 10^{-24}$ gm. and a velocity of $1.4 \times 10^9$ cm/sec. ($2 \times 10^6$ ev. per deuteron) has a momentum of:

$$6.3 \times 10^{14} \times 3.3 \times 10^{-24} \times 1.4 \times 10^9 = 2.9 \text{ gm. cm/sec.}$$

The force imparted to the pellet by the deuteron pulse compressed to $10^{-10}$ sec. is $2.9 \times 10^{10}$ dynes. For pellets of the following radii, this force exerts a pressure in atmospheres (1 atmosphere = $1.0 \times 10^6$ dynes) given in the table:

| Pellet | | Pressure in Atmospheres | |
|---|---|---|---|
| Radius cm. | Area cm² | ($I = 10^4$ amp) | ($I = 10^5$ amp) |
| $10^{-2}$ | $12.6 \times 10^{-4}$ | $2.4 \times 10^7$ | $2.4 \times 10^8$ |
| $3.2 \times 10^{-3}$ | $12.6 \times 10^{-5}$ | $2.4 \times 10^8$ | $2.4 \times 10^9$ |
| $10^{-3}$ | $12.6 \times 10^{-6}$ | $2.4 \times 10^9$ | $2.4 \times 10^{10}$ |
| $5.0 \times 10^{-4}$ | $3.1 \times 10^{-6}$ | $.97 \times 10^{10}$ | $10^{11}$ |

SOURCE CURRENT DENSITY

Consider two cases of total ion current, first of $10^4$ amperes and second of $10^5$ amperes. Assume that the current sources, positive ion and electron sources together occupy 5% of the source reference sphere. Further, assume that of this 5% area, the positive ion source takes 2%, and the inner and outer electron cone sources each take 1% and the central 1% is unused by the sources.

For the first case, assume a source sphere radius of 4 meters. Then, the area S is:

$$S = 4\pi \times 16 \times 10^4 \text{ cm}^2,$$

$$2\% S = s = 4.0 \times 10^4 \text{ cm}^2,$$

$$\text{current} = 10^4 \text{ amp}$$

$$\text{current density} = 0.25 \text{ amp/cm}^2.$$

For a source sphere of 2 meters radius, the ion current density would be 1 amp/cm².

For the second case, assume a source sphere radius of 10 meters. Then:

$$S = 4\pi \times 10^6 \text{ cm}^2,$$

$$2\% S = s = 2.5 \times 10^5 \text{ cm}^2,$$

$$\text{current} = 10^5 \text{ amp}$$

$$\text{current density} = 0.40 \text{ amp/cm}^2.$$

A source sphere of 5 meters radius would give a current density of four times that or $5\pi$ amp/cm².

All of the above current densities are possible on the basis of current technology. Oxide coated surfaces can emit electron at 1 amp/cm² continuously, or 10 to 100 times that in short pulses on a basis of experience with long life cathodes.

OPERATION

The system described herein depends on precision focusing of a particle beam of relatively low particle energy (for example, 50 kilovolt deuterons) on a target of about 0.1 mm diameter. Ions of this energy will deposit all their kinetic energy and momentum in a target of this size even after it is approaching the ignition temperature of about $10^{8°}$ K.

This method uses ballistic or geometric focusing so that variations in the energy of the ions will not be dispersive with respect to the focus. This is necessary in order to allow variation of the ion acceleration energy during the ion pulse so that time compression of the pulse will shorten its duration during the time of flight from the ion source to the pellet target. This effect is known as time, phase or duration compression. Such pulse duration compression may be used in the range of compression ratios from 100 to 10,000 times. For purposes of example a pulse duration compression ratio of 1000 is employed in the calculations following. Pulse compression for ratios including 10,000 to 1 are now used in radar applications and compressions of more than 1000 have been produced in electron pulses. Ion pulses compression for high ratios is also experimentally verified.

The required geometric or ballistic focusing ratio cannot be achieved for the necessary current density at the pellet (target) with positive ions only. This is because of the strong repulsive forces encountered within a volume of space charge of solely one sign. It is therefore necessary to neutralize the spaced charge by providing a sufficient density of electrons or negative ions so that space charge forces are essentially cancelled. This requirement becomes more and more critical as the target is approached by a pulse of ions. The packet density of charge which must be neutralized to permit focusing is produced by both the concentration of charge of the ions, caused by geometric focal compression and pulse duration compression. Pulse duration compression causes the total ion charge in a pulse to occupy a continually smaller length along the ion path as the pulse approaches the target. If electrons (or negative ions) are provided traveling with the ion pulse then space charge produced expansion is eliminated. The electrons must travel with the ion pulse and have essentially the same total charge as that in the pulse. The presence of a sufficient pulse of electrons dispersed throughout the ion pulse will prevent the expansion of the pulse in all three dimensions of space and by traveling with the ions at essentially the same velocity eliminate instabilities due to trapped electric field volumes in the ion pulse.

It is therefore an important feature of this invention to provide a mixture of beams of both positive and negative electric charge associated in such a way as to form an essentially electrically neutral pulse before geometric compression and duration compression have become strong enough for space charge density to produce forces which can interfere with the size of the ultimate focal spot of the final neutral beam at the target-pellet.

In the embodiment described above, this mixing of beams of opposite charge after acceleration and focal directing is accomplished by combining interleaving hollow conical beams of positive and negative charge starting near the beam sources and continuing to the target. Alternative embodiments are described hereinbelow in which a radial or rectangular array of focused ion beams are interleaved so that the thickness of any single space charge volume of one sign is small at the time and position immediately after acceleration, so that the neutralization produced by mixing the beams takes place as near the origin of the beam as possible. Thus, any space charge forces which may exist are kept to a minimum and allowed a minimum duration at which to produce any blurring action on the final ion focal volume. An example of the design details of a preferred embodiment of this invention can be calculated as follows:

Assume a deuterium-tritium pellet of 0.1 mm radius consisting of a half and half frozen deuterium-tritium mixture. The density of this pellet will be about 0.25 gm per cubic-centimeter. Since the average gram atomic weight of this mixture is 2.5 gm each cubic-centimeter contains 0.1 gram-mol. Applying Avogadro's number we have $0.1 \times 6.022 \times 10^{23} = 6.022 \times 10^{22}$ atoms per cubic centimeter for the pellet material. Thus we have $6.022 \times 10^{22} \times$ volume—number of atoms requiring energy to bring them to reaction temperature. The volume of a pellet of 0.1 mm radius is given by $4/3 \pi r^3 = 4\pi/3 \times (0.01)^3 cc = 4.189 \times 10^{-6} cc$. Thus we have $6.022 \times 10^{22} \times 4.108 \times 10^{-6} = 2.322 \times 10^{17}$ atoms to bring to ignition temperature of $10^8$ K. It is convenient to deal with this in terms of electron volts average energy per particle.

A mass of gas in which the atoms have one electron volt per particle has a temperature of 11,600 K. as shown by dividing the ergs per electron volt $(1.6022 \times 10^{-12})$ by the Boltzmann Constant in ergs per degree $(1.38066 \times 10^{-16})$. $1.6022 \times 10^{-12} \div 1.38066 \times 10^{-16} = 11,604$ K. Thus $10^8$ K. corresponds to an average energy per atom of $10^8 \div 11,604 = 8618$ electron volts per atom. The ionization energy and molecular binding energy are so small compared to this value as to be negligable for this calculation. Thus, if we calculated the product of the number of atoms in the pellet by the electron volts average energy per particle by the number of Joules per electron volt we will have the basic number of Joules required to heat the target to $10^8$ K.

Thus, $2.522 \times 10^{17} \times 8618 \times 1.6022 \times 10^{-19} = 348$ Joules (Required ignition energy.) This energy is supplied by a pulse of 50,000 electron volt deuterons lasting about $10^{-9}$ seconds. Since 8618 electron volts of energy must remain in each bombarding deuteron as it joins in the fusion mass, only $50,000 - 8618 = 41,382$ electron volts per bombarding particle are left to heat the original pellet mass. Thus, $41,382 \times I \times 10^{-9} = 348$ Joules. The required current I of one nanosecond duration is thus, $$I = \frac{348 \times 10^9}{41,382} = 8.409 \times 10^6 \text{ amperes,}$$

and each of the six bombarding ion sources must therefore produce a minimum of $1.4 \times 10^6$ amperes for one nanosecond at the target. Since a pulse duration compression ratio of 1000 is used, each ion source must produce $1.4 \times 10^3$ amperes for one microsecond before time of flight pulse duration compression. At an ion density of one ampere per sq. centimeter (a factor of 20 and more below sources reported in the literature) 1400 sq. centimeters of ion source area will be required at each ion source. A 60 cm radius circular area having 11,300 sq. centimeters is geometrically available. Thus, $11,300/1400 = 8$ and only one eighth of the available area is required leaving ⅞ for electron source and focusing and shielding. Any inefficiencies of focusing or other practical deviations from ideal design can thus be overcome by increasing the ion source area or the ion current density or the length of the starting pulse and the pulse duration compression ratio.

The energy released from the simple D+T reaction is D+T→He$^4$+n$^1$+17.6 Mev. Thus a completely fusion burned pellet containing 2.522×10$^{17}$ atoms will be given by
$\frac{1}{2}$×2.522×10$^{17}$×17.6×10$^6$×1.6×10$^{-19}$=3.68×10$^5$ Joules. Dividing this energy release by the ignition energy of 348 Joules (3.68×10$^5$÷348=1059) gives a three order of magnitude energy conversion efficiency. Thus we have more than two orders of magnitude to distribute among inefficiencies of focusing, compression, expansion, and other possible losses, and still have a useful energy release.

ALTERNATIVE REACTION CHAMBER

An alternative and presently preferred embodiment for the reaction chamber of the invention is illustrated in FIG. 9. A reaction space 31 is located at the center of a spherical shell 32 which is evacuated. A plurality of arrays 33 of beam sources is mounted within the shell 32, typically supported in another shell 34. Four arrays 33 are shown in FIG. 9, and preferably six arrays are utilized positioned almost orthogonally with respect to each other. Each of the arrays provides a combined particle beam focused at the reaction space 31. The arrays are aligned substantially orthogonally so that the forces of the particle beams on a pellet at the reaction space will be substantially in balance, but the arrays are slightly off the orthogonal axis so that one array is not directing a beam directly into another array.

In an alternative configuration, three arrays may be disposed to provide a first set of three orthogonal beams and three additional arrays may be disposed to provide a second set of three orthogonal beams. The arrays are positioned so that the apices of the first and second sets coincide at the reaction space, with one set rotated relative to the other so that the beams are substantially out of alignment.

A pellet supply source 36 is mounted in the shell 32 and provides for periodically launching the pellet along the path 37 to the reaction space 31. Various pellet launching devices may be utilized, such as a compressed air gun.

A separate power supply 38 is shown for each of the arrays 33. In the preferred embodiment, the beam sources of the arrays are pulsed and synchronized with the pellet supply so that the beams arrive at the reaction space at the time the pellet arrives. Synchronization is controlled by a timing unit 39 which provides control signals to the pellet supply 36 and to each of the pulse supplies 38. A sensing unit 40 is positioned along the path 37 for sensing movement of a pellet to provide a signal to the timing unit so that the power supply 38 may be triggered at the proper time.

A neutron absorber, such as a lithium layer 42 is positioned about the reaction space, typically by utilizing the lithium as an inner layer on a support shell 43. Openings are provided in the shell 43 for the particle beams and for the pellet, and an opening is provided in the shell 34 for the pellets. Neutrons from the reaction space are absorbed by the lithium, producing heat, which in turn is removed from the reaction chamber by conventional means, such as by circulating a heat transfer fluid through pipes 45 on the exterior of the shell 43. The heat exchanging fluid is circulated by a fluid pump 46 and heat is extracted from the fluid in a heat exchanger 47. The heat from the heat exchanger may be utilized for conventional purposes, such as generating electric power and the like.

BEAM ARRAYS

Detailed estimates of the ion pulse power and momentum required for efficient ignition of a pellet of fusion fuel are of a magnitude that indicates the possible need to neutralize space charge at an earlier region of the ion focus drift space than that provided by the intersecting conical system previously described. Also, it has been determined that ion beams which are narrow in one of the tranverse dimensions will probably produce considerably greater ion density than may be possible from ion sources of large extent in both transverse dimensions. This is because of the effect of space charge of the emerging focused ions on the accelerating field electrodes. A narrow gap between the halves of the accelerating gate electrode can produce a sufficiently transversely uniform field boundary to provide focusing and acceleration forces without the use of grid bars across the ion stream. A more efficient use of the ion source active area is achieved by a slit rather than a grid.

Thus, thin beams of ions, extensive in only one of the dimensions transverse to the ion acceleration and velocity vectors, can be produced with greater efficiency and greater ion density than beams extending over an area of large dimensions in both transverse directions.

This type of beam geometry is also desirable because it allows similarly thin beams of electrons to be interleaved with the positive ion beams after acceleration and focus, thus providing for intermingling of beams of opposite sign, and space charge neutralization at an earlier position in the ion focusing drift space. Much greater density of bombarding particles at the target-pellet can thus be provided without encountering space-charge defocusing of effective magnitude before beam neutralization.

The achievement of this space-charge neutralization earlier in the focal drift region requires a geometric arrangement of beams different than the conical system. Interleaving flat wedges of alternating electron and ion beams are required to reduce space-charge defocusing still further. Two geometric patterns are now considered useful with thin slab ion and electron beams. Negative ion beams may, of course, be used instead of electron beams with the advantage of doubling the momentum and energy of the total bombardment. However, electrons are preferred because of the added difficulty of producing large currents of negative ions. Also, the mass of the negative ions adds difficulty to the detailed neutralization of the beams. Whenever charged particle beams are mentioned in this specification and the claims, the intent is to include positive ion beams, negative ion beams and electron beams.

One geometric arrangement of a group of thin slab beams into a total beam complex is to arrange the beams in a radial array around the central axis which extends from the center of the composite beam source to the pellet-target. This arrangement has the advantage of ease of design of the mechanical mount and microadjustment of the individual beams and the composite.

An alternative arrangement of line type ion and electron sources is a square array with a spherical exit surface. This arrangement allows the pulse voltage and power to be brought in from the rear of the ion and electron sources by a stack of flat transmission lines which are easily isolated from interfering with each other by interleaving ground planes. A vacuum seal can be designed for these power leads if desired, and the conducting material can be thin enough to provide flexibility for mechanical adjustment.

The ion sources are geometrically shaped and internally designed to produce ion beams originating at definitely positioned and shaped surfaces, so that the emerging ions are geometrically and ballistically focused on the pellet-target.

It is important that this focusing is non-dispersive with respect to particle velocity, because time focusing or pulse compression, due to variation of ion velocity during the driving pulse, is also desirable for producing a short bombardment time and a high momentum pressure and power density at the pellet.

Figure 10:
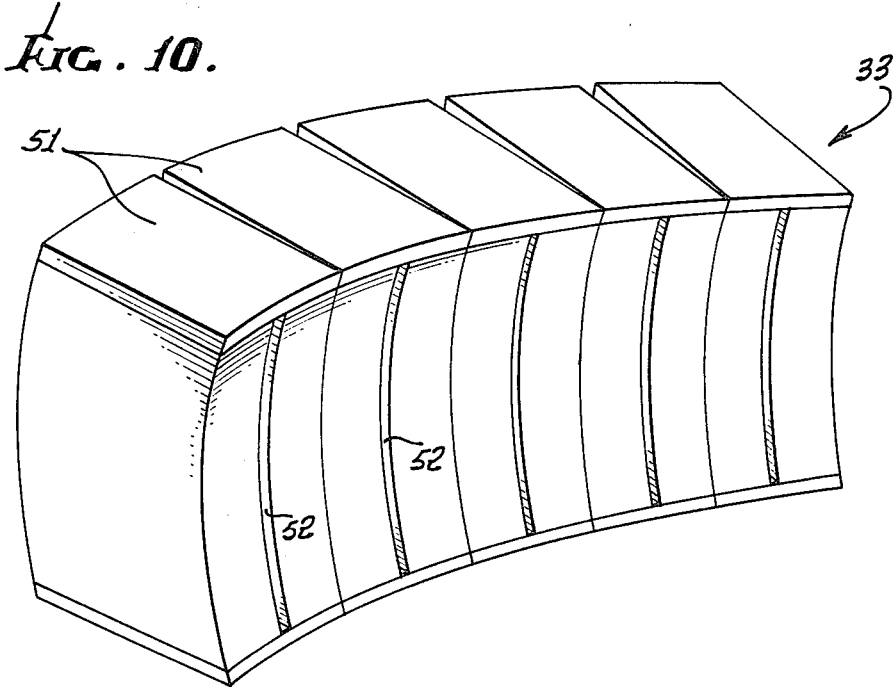
FIG. 10 is an enlarged perspective view of one of the beam source arrays of the apparatus of FIG. 9.
Figure 12:
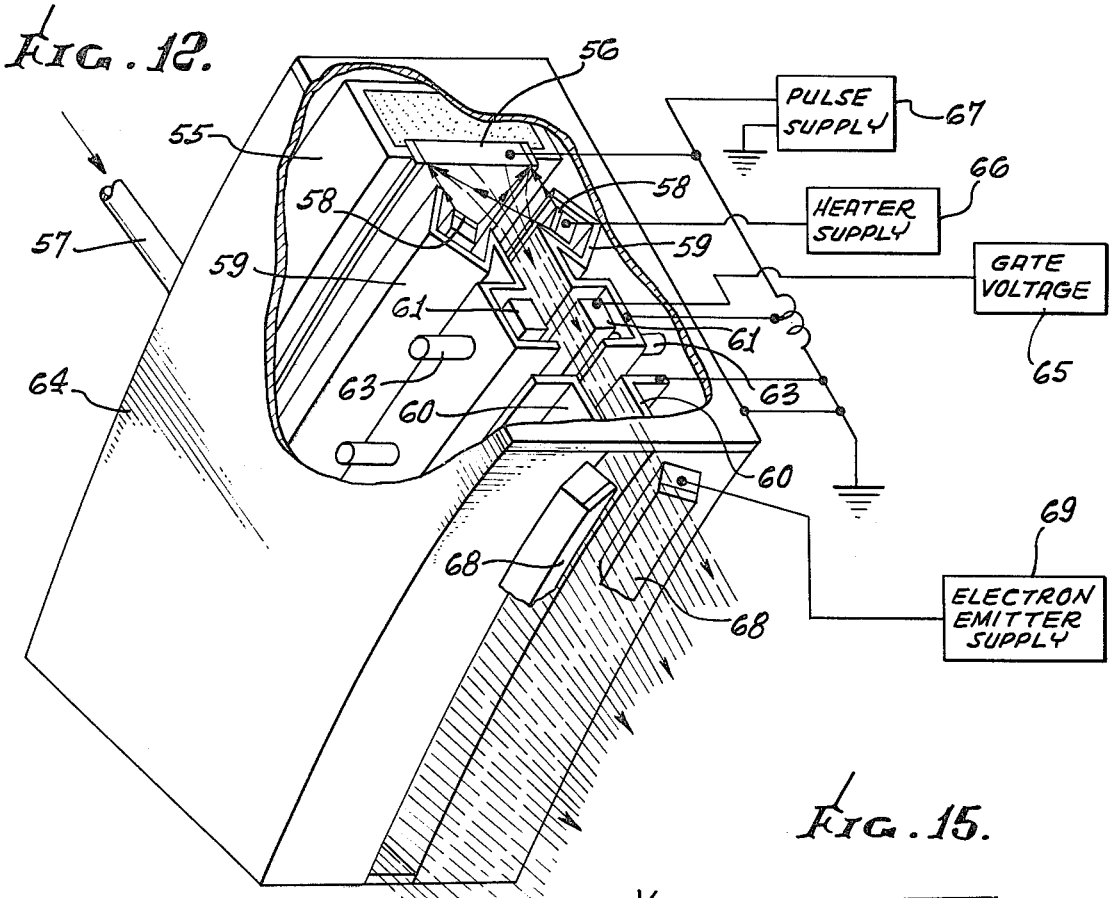
FIG. 12 is a perspective view of a beam source suitable for use in the arrays of FIGS. 10 and 11.
Figure 13:
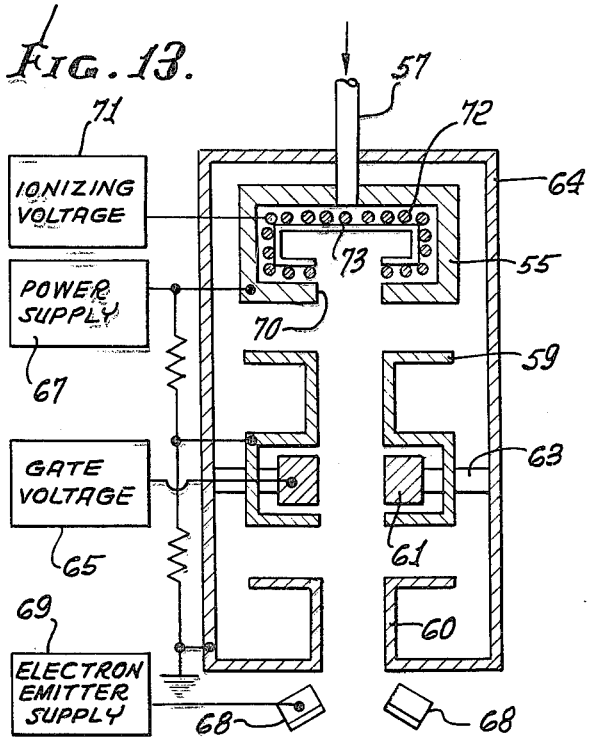
FIG. 13 is a sectional view of an alternative beam source.
Figure 14:
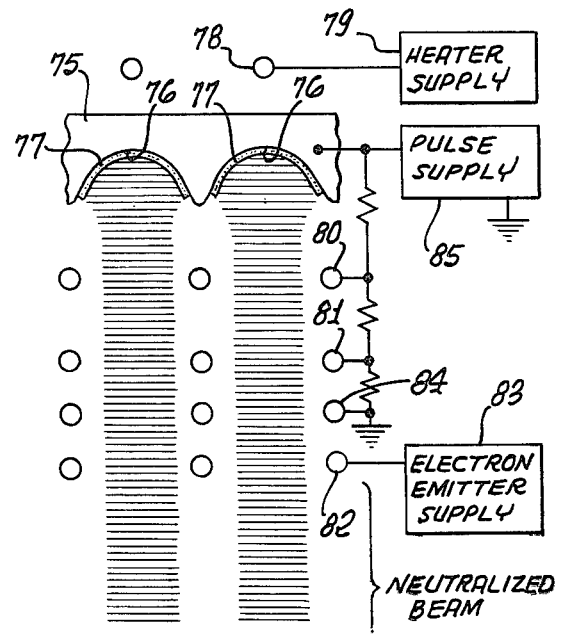
FIG. 14 is a view similar to that of FIG. 13 of another beam source.

One such square type array with a spherical exit surfact is illustrated in FIG. 10. This particular array illustrates only five sources 51 but more sources may be utilized as desired. Also, the concave exit surface is shown as generally rectangular with exit slot 52, while a larger and generally square concave surface ordinarily would be utilized. Several forms for the sources are shown in FIGS. 12-14.

Figure 11:
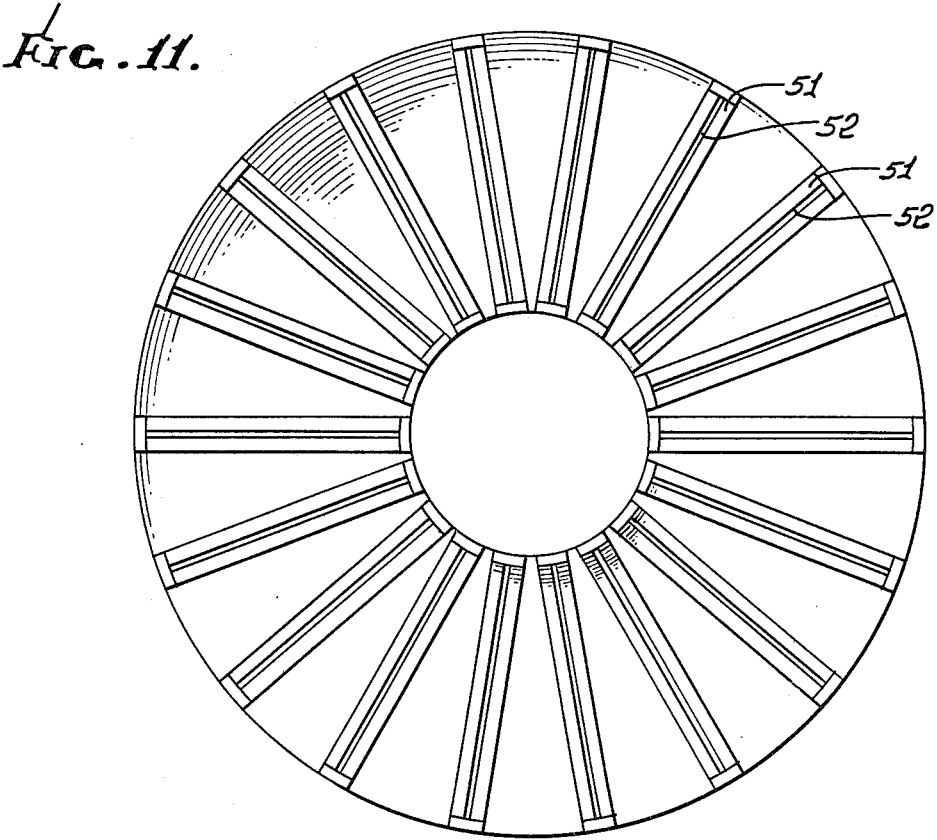
FIG. 11 is a front view of an alternative beam source array suitable for use with the apparatus of FIG. 9.

An alternative array configuration is illustrated in FIG. 11, with the line or slot sources 51 disposed radially about a central point. The array as viewed in FIG. 11 would be concave to focus the beams toward the axis which would be a line perpendicular to the paper and passing through the center of the array.

ION BEAM SOURCES

The central problem of high-current density ion source design is the "Child's Law" limitation. Since this limits the current per unit area inversely proportional to the square root of the mass of the ion (or electron) this problem is correspondingly more severe for heavy ions. Child's Law formula $$J = \frac{4\epsilon_0}{9} \sqrt{\frac{e}{M}} \frac{V^{3/2}}{X^2}.$$

The limit is caused by space charge and the dependence of space charge density of ion velocity. However, Child's Law can be completely overcome either by large electric fields, space-charge neutralization or a combination of these factors. Electron emission is now possible from special electron emitters at current densities as high as 100 amperes per sq. centimeter, for continuous current. Higher values up to 1000 amperes per sq. centimeter may be possible for short pulses. Indeed, much higher values are in use from point field emitters with nanosecond pulses.

For deuteron ion emission the mass factor of 3672 times the electron mass would cut deuteron current densities to possibly $100/\sqrt{3,672}$ or 1.6 amperes per sq. centimeter if Child's Law had to be faced for the same field configuration as with the electron emitter and with no provision for space charge neutralization. This is not a necessary limit fortunately because electron emission and ion emission can be combined in a counter flow system to eliminate the Child's Law limit. The sources of this invention provide a means for emitting and accelerating ions such as protons, deuterons, helium ions, lithium ions, etc., at high current densities up to 100 amperes per sq. centimeter and above by combining electon emitters, ionization surfaces and a counter flow of ions and electrons. The immediate application of this ion source to deuterium fusion and deuterium-tritium fusion and other fusion reactions for controlled power and energy release purposes and for the low cost production of neutrons for transmutation purposes make a line type source desirable. The line type source is not a limitation of the present invention, however, and the line system shown is on the presently preferred example of various useful geometric possibilities for this invention.

One embodiment shown in FIG. 12 consists of an enclosure 55 for containing the element or a chemical compound including the element which it is intended to produce in the form of an ion beam. This element or compound is released through one face or specified area of the enclosure 55 by allowing it in gaseous or liquid form to seep through the specified area. A porous metal or semiconductor or conductive ceramic member 56 is provided in the wall of the enclosure to allow this seepage. The rate of seepage is controlled by the porosity provided and by control of the pressure and temperature of the material used as a source of the desired ions, which is introduced into the enclosure 55 through a line 57. This arrangement produces a relatively high controlled density of ion producing matter on the specified surface so that this surface is the place of origin of ions for this type of ion source. This is important because generation of ions at a definite surface is equivalent to coherence for the wave nature of the ions as particles, and the surface may be curved to provide the desired beam shape. This is analogous to coherence in optical cases as it provides a definite wave front position of prearrangeable geometry for the wave nature of the ions. Such a geometrically specified ion wave front allows the maximum possible focusability for the ion beam formed from this definite accurate source surface.

The ions for the charged particle beams are formed at their seepage source surface by bombarding that surface with sufficiently energetic electrons. It is desirable for these electrons to be moving in a direction approximately opposite to the direction in which the ions are accelerated. When positive ions are produced in this ion source, the same electric field that accelerates the ions from their source surface can be used to accelerate electrons from electron sources 58 into the initial ion source surface to produce the original ionization. Thus, electrons and ions will be traversing the same space near the ionization surface and in the space between that surface and the acceleration electrodes 59, 60. This counter flow of exciting electrons and ions from their surface of origin will produce a suitable degree of space charge neutralization in the critical volume necessary to circumvent Child's Law and allow the emission of very large ion current densities from this source. Two line electron sources 58 are focused on the ion emitting surface 56 accelerated by shields which are the beam forming accelerator electrodes 59 for the ions formed by the electrons at the ion-material seepage surface. This arrangement of electron emitters and acceleration electrodes allows the electrons to reach the ion-forming surface but prevents the ions because of their persistance of momentum from reaching the electron emitting surfaces and thereby sputtering them away or destroying their electron emissibility or shortening their lifetime. The electron sources may be conventional and may be energized from a heater supply unit 66.

In this configuration the accelerated electrodes 59 may be operated at ground potential or the potential of an enclosure in which the ions are used so that the ions emerge into an essentially field-free volume. However, if one acceleration space does not provide for enough tracted into the positively charged ion beam for physical mixing, to produce the neutralized beam.

While hollow conical and fan shaped beams have been disclosed above, a circular or cylindrical beam, i.e., a converging pencil beam, may be used in some applications.

In the system of the present invention, the electron and positive ions of the electron and ion beams are intermixed physically so that the total electrical charge of the combined beams is substantially neutral. However neutral atoms are not obtained during this mixing. A positive ion will tend to attract an electron; but the attraction will add energy to the electron and on collision, the electron will bounce rather than sticking, so that the ion and electron remain separate. The actual transit time for a particle in the beam between the source and the target is very small. For a system with a four meter beam length between source and target, the average number of collisions between electrons and positive ions during transit is about 1½. Therefore the beam is not a plasma and there is no thermodynamic equilibrium. The compression of the beam due to focusing is not an adiabatic compression and hence does not spoil the focus.

The electrons should be mixed with the ions very early in the beam, preferably not more than a few centimeters from the source. The higher the current density, the nearer to the source the electrons should be introduced. For very low current densities, mixing might even occur one meter from the source in a four meter beam.

The electrons should have the same velocity and velocity profile as the positive ions so as to accompany the positive ions during the transit from source to target. This is achieved by appropriately controlling the accelerating voltages. Then the energy of the electron is much lower, being about 1/3600 of a deuterium particle. Therefore, the electrons are colder and have less random energy and will absorb random energy of the ions thereby cooling the beam. This cooling effect improves the ability to obtain a fine focus of the beam at the target.

In order to reduce or eliminate beam disturbance, the space between the source and target should be free of gases and free of electromagnetic fields. Also, the beam should be relatively thin if a flat or fan shape, and of relatively small diameter if conical or cylindrical. For a beam with a current density of about 1 ampere per sq. centimeter (about the minimum current density which can produce fusion), the beam should be not more than about 1 centimeter in thickness or in diameter. For a current density of about 50 amperes per sq. centimeter, this thickness or diameter should be not more than about ½ millimeter. These measurements are made at the beam source.

The ion sources are shaped so that the particles are directed to the target ballistically, that is, the direction given to the particle as it leaves the source determines the path of the particle to the target. Because of the low mass of the electrons with respect to that of the positive ions, introduction of the electrons into the ion beam will not expand the beam because a collision of an electron and a positive ion will not impart enough momentum to the heavy particle to defocus it.

PULSE COMPRESSION

The application of phase focusing (time focusing or variable velocity pulse compression) to produce a maximum energy and momentum at the target in a pulse time which is short compared to the pulse time at the ion source, is an important feature of the process and apparatus of the invention.

This pulse compression or time focusing allows a starting ion pulse at the ion source to last one or more microseconds and, becuase of ion velocity variation during the accelerating pulse at the ion source, to compress the original pulse to a nonosecond or less at the target. This result is achieved by accelerating the first ions to leave the ion source to an appropriately less velocity than those at each succeeding interval during the pulse, so that in the drift time and space to the target, the last accelerated ions will just catch up with the first accelerated ones as the aggragate pulse reaches the pellet-target. This action allows the power density, momentum density and particle density to arrive at the target to be multiplied by a large factor (up to 1000 or more), compared to corresponding quantities produced by the ion source over a longer time interval.

Figure 15:
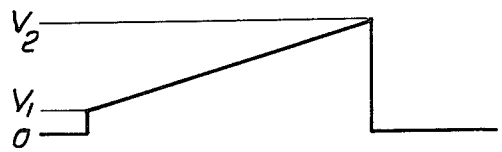
FIG. 15 is a wave form diagram illustrating a pulse suitable for the beam sources.

The wave form for a pulse for the beam source for achieving this beam compression is shown in FIG. 15. This pulse may be provided by the pulse supply 67, with the output rising from 0 to a first value v1 at the time of turn on. Then during the duration of the pulse, the pulse amplitude rises steadily to magnitude v2. At the end of the pulse time, the pulse magnitude then drops to 0. Typically the pulse duration is in the order of a microsecond, with the source producing ions throughout this time period. The ions in the beam at the start of the pulse will be traveling at a slower velocity than the ions in the beam at the end of the pulse because the accelerating potential has increased during the pulse. By appropriately selecting the magnitudes and distances, the particle beam of one microsecond duration at the source can be compressed to a particle beam of one nanosecond duration at the reaction space.

FOCUSING

A simplifying feature of the present invention is the use of ballistic or geometric prefocusing followed by space charge neutralization, so that the focusing is not deteriorated by the variation of velocity during the ion pulse which is required to produce pulse duration compression (phase or time focusing).

The embodiments disclosed implement this simplifying feature. However, it is not intended to exclude the possibility that stronger focusing means can be used after acceleration and before space charge neutralization. Thus, either magnetic lenses or electrostatic lenses or both can be interposed between the beam accelerating means and the space charge neutralizing action of the added electron beams. When this is done some provision should be made to overcome the differing focal properties of such lenses inherent in their action on ions of various velocities. This necessary compensation will be provided by increasing the field strength of these lenses during the passage of the ion pulse in such a way that the more energetic ions which come later in the primary ion pulse will be focused to the same geometric focal volume as the earliest lower energy ions which are first to emerge from the ion sources. The application of electrostatic or magnetic field energy changes to the lens system may be monitored and computer controlled to fit the ion velocity at all infinitesmal time intervals during the passage of the ion beam pulse through this extra lens system which is in the field-free drift space external to the ion source or sources.

potential to give the ion the desired final energy an additional set of accelerating electrodes 60 can be provided, and these electrodes may be at ground potential or at the potential of a field-free volume provided for the desired interaction of the ions for whatever purpose they are to be used.

Additional gateing electrodes 61 can be provided to control the ion current as a control grid controls the electron current in an electron vacuum-tube. These electrodes can be shielded so as to intercept a minimum of stray ion current, and may be supported on insulating posts 63 along with electrodes 58 within a housing 64.

The surface of ion origin must be plane or concave in the direction of the ion beam if the ions are to be focused to a sharply defined focal area. This can be done by curvature in both dimensions perpendicular to the nominal ion direction.

Indeed, the shape of this surface can provide geometric or ballistic focusing for the ions to a very fine line or sharp focal point. The timing and intensity as a function of time of the ions can be controlled by varying the potential of the gate control electrodes 61 from a gate voltage source 65. The gate and accelerating electrodes are shown as bars forming slits for the production of a line ion beam. This ion source can be designed for wider areas of ion emission by placing grid wires across the space between the beams forming bars if the area required is such that the ratio of slit bar separation to electrode separation along the beam direction requires such grid wires to produce the necessary electric fields throughout the acceleration space.

A large variety of materials can be used for accelerating electrodes and grids as is the case in electron vacuum tubes. Tungsten, molybdnem and tantalum are good examples of refractory materials which will provide good electrical conductivity and rigid mechanical accuracy. Tungsten particularly may be carburized so that tungsten carbide is formed on the surface. This enhances the black body radiation from the electrode surface where radiation is the principal method of cooling. If fluid cooling is provided or conductive cooling other materials are suitable such as silver, copper, nickel, or various alloys such as stainless steel, inconel or invar.

The materials suitable for the porous surface may depend on the particular ion to be produced. Paladium is suitable for forming ions of any of the hydrogen isotopes because of its well known property of leaking hydrogen selectively when heated to an appropriate temperature. Porous tungsten, porous titanium, porous zirconium are suitable for many ions. Silicon or germanium in porous form may also be used. All of these materials in porous form can be loaded with various dopings or oxides and carbonates which form local surface electrical gradients and/or Fermi levels to enhance or produce surface ionization of gaseous or liquid ion material passing through the pores.

A power supply 67 provides appropriate potentials to the surface 56, accelerating electrodes 59, 60 and housing 64. In the preferred embodiment, pulsed beams are produced and a pulse is provided from the supply 67. In an alternative mode of operation, the supply 67 may provide steady state power, with pulsing being controlled by the gate electrodes 61, which are not necessary when the supply 67 provides a pulse. In another mode of operation, the source may be operated in the steady state mode but this will ordinarily provide a substantially lower output.

The ions produced at the member 56 preferably are of a fusible material similar to that utilized in the pellet so that the particles of the beam will not contaminate the reaction at the pellet. However, in some applications it might be preferable to utilize heavier ions in the particle beams to increase the impact of the beams on the pellet.

Electron sources 68 powered from a supply 69 are positioned adjacent the ion beam source housing 64 to provide electrons for mixing with the ions. The sources 68 may be constructed in the same manner as the sources 58. It is desirable that the sources 68 be unipotential emitters so that there is no voltage differential along the emitter and no magnetic field present to disturb the beams. This may be accomplished by turning off the heater current during the ion pulse or by using a hairpin shaped heater.

An alternative embodiment for the ion beam source is shown in FIG. 13, where elements corresponding to those of FIG. 12 are identified by the same reference numerals. The ions are produced within the enclosure 55 and are accelerated outward through a slot 70 by the accelerating electrodes 59, 60. Pulsing may be controlled by the gate electrodes 61. Ions are produced within the enclosure 55 by means of a high voltage from a source 71 connected to an array of grid wires or rods 72 supported on bars 73 within and closely spaced to the inner wall of the enclosure 55.

The inner surface of the enclosure 55 which serves as the electron or ion emitting surface is relatively large compared to the emission opening or slot 70. The source may be operated steady state or may be pulsed, as by the gate voltage unit 65 or by pulsing the power supplies 67 and 71 while omitting the gate electrodes. The inner wall of the enclosure 55 is formed of or coated with an appropriate electron emitting material, and a variety of such materials are available. In one alternative configuration, electrons may be generated within the enclosure by heating the enclosure rather than by utilizing the ionizing grid. Typical operating temperatures are in the range of about 1000 K.° to about 2600 K.°.

Sources of this type are capable of generating current densities of from about 10 to 1000 amperes per sq. centimeter in a continuous stream and from about 100 to about 10,000 when pulsed, and this range includes the order of magnitude of current density calculated to be necessary to raise a nuclear fusible material to the reaction temperature.

Another source configuration is illustrated diagrammatically in FIG. 14. An ion emitter support or substrate 75 has an array of concave surfaces 76, each having a layer 77 of an emitter material. The emitter is heated by a heater grid 78 powered from a supply 79. Extraction grids 80 are positioned adjacent the emitting surface, and high voltage accelerating grids 81 are positioned adjacent the extraction grids 80. Electron emitters 82 powered from an electron emitter supply 83 are positioned downstream from the high voltage grids 81. Electron suppressor grids 84 may be positioned between the high voltage grids 81 and the emitters 82. A pulse power supply 85 is connected across a voltage divider providing inputs to the ion emitter, extraction grids, high voltage grids and electron suppressor grids. The operation of this configuration is similar to that of the sources previously described. Ion beam pulses are produced from the emitter material 77 and are accelerated by the high voltage grids 81. Electron beam pulses are produced at the electron emitters 82 and are at-

REFERENCES (1) Kammash, Jerry, *Fusion Reactor Physics,* Ann Arbor Science Publishers (1975).
(2) Glasstone and Lovberg, *Controlled Thermonuclear Reactions,* Van Nostrand (1960).
(3) Ribe, F. L., *Reviews of Modern Physics* 47, 7 (1975).
(4) Emmett, John L. Nuckolls, John and Wood, Lowell, *Scientific American* 230, 24 (1974).
(5) Nuckolls, John, Emmett, John and Wood, Lowell, *Physics Today* 26, 46 (1973).
(6) Clarke, J. S., Fisher, H. N., and Mason, R. J., *Physical Review Letters* 30, 89 (1973).

I claim:

1. In a process for compressing and heating pellets of nuclearly fusible material with a focused electrically neutral charged particle beam, the steps of:
   positioning a pellet of nuclearly fusible material in a reaction space within a reaction chamber substantially free of gas and electromagnetic fields;
   periodically producing at locations remote from and spaced around the reaction space, a plurality of groups of charged particle beams, each of the groups of beams comprising a plurality of combined beams,
   each of the combined beams comprising a stream of positive particles and a stream of negative particles produced from sources adjacent each other and traveling from the remote locations to the reaction space at substantially the same velocity and velocity profile and physically mixed to provide an overall electrically substantially neutral combined beam without neutralizing the positive and negative particles and wherein substantially all of said physical mixing takes place at a location immediately adjacent said sources; and
   each of focusing the combined beams from the remote locations to the pellet in the reaction space by ballistically focusing each stream of each combined beam prior to forming said combined beam with said ballistically focusing being the sole focusing of the combined beam, substantially all of said positive and negative particles in the electrically neutral combined beams remaining as charged particles throughout their travel,
   with the plurality of combined beams impinging on, compressing and heating the pellet by imparting energy and imploding momentum thereto.

2. The process as defined in claim 1 including producing each beam as a pulse of particles of a first duration and compressing the pulse of particles to a second shorter duration.

3. The process as defined in claim 2 including producing particles with a lower velocity in the early portion of the pulse and with a higher velocity in the later portion of the pulse.

4. The process as defined in claim 1 wherein the positive streams are of fusible positive particles.

5. The process as defined in claim 1 wherein the positive and negative streams are of fusible particles.

6. The process as defined in claim 1 wherein the positive streams are of fusible positive particles and the negative streams are of electrons.

7. The process as defined in claim 6 wherein the electrons have lower random energy than the positive particles and absorb energy from the positive particles.

8. The process as defined in claim 6 wherein the positive particle streams are fan shaped and not substantially more than one centimeter thick.

9. The process as defined in claim 6 wherein the positive particle streams are cylindrical and not substantially more than one centimeter diameter.

10. The process as defined in claim 1 including producing each of the individual beams of a group with a rectangular cross section with the length many times the width.

11. The process as defined in claim 10 including producing the beams of a group in an array disposed parallel to each other.

12. The process as defined in claim 10 including producing the beams of a group in an array radially about a center.

13. In an apparatus for compressing and heating pellets of nuclearly fusible material with a focused electrically neutral charged particle beam, the combination of:
   a chamber substantially free of gas and electromagnetic fields and having a reaction space therein with said pellet positioned therein;
   a plurality of sources or beams of charged particles positioned remotely from and spaced around said reaction space, with said sources mounted in groups and with the sources of a group forming an array, with means at said sources for ballistically focusing the beams of an array to converge toward the pellet in said reaction space,
   each of said sources including means for producing a stream of positive particles and a stream of negative particles traveling at substantially the same velocity and velocity profile from the source to the pellet in the reaction space, with said streams of magnitudes such that when physically mixed remote from said reaction space the resultant combined particle beam is electrically substantially neutral means immediately adjacent said sources for causing said physical mixing, said ballistically focusing means focusing each stream of each combined beam with said ballistically focusing being the sole focusing of the combined beam, said magnitudes being sufficient to ensure that substantially all of said positive and negative particles in the electrically neutral combined particle beam remain as charged particles throughout their travel; and
   control means for periodically turning said sources on and off to produce said beams in pulses.

14. An apparatus as defined in claim 13 wherein said control means includes means for reducing the time duration of said pulsed beams.

15. An apparatus as defined in claim 13 wherein said control means includes means for producing particles from the source at a lower velocity at the start of a pulse and at a higher velocity at the end of the pulse for compressing the pulse as it travels from the source to the reaction space.

16. An apparatus as defined in claim 13 wherein each of said sources has a beam outlet slot, and the sources of an array are arranged side by side with said slots substantially parallel.

17. An apparatus as defined in claim 16 wherein said sources are curved and said array is curved to focus said beams at said reaction space.

18. An apparatus as defined in claim 13 wherein each of said sources has a beam outlet slot, and the sources of an array are arranged about the center with said slots radiating from said center.

19. An apparatus as defined in claim 18 wherein said sources are curved and said array is concave to focus said beams at said reaction space.

20. An apparatus as defined in claim 13 wherein each of said sources includes:
an enclosure for an ionizable material and having an outlet zone;
means for producing ions of the material of one polarity at said outlet zone; and
electrode means for accelerating said ions away from said zone in a beam.

21. An apparatus as defined in claim 20 wherein said source enclosure includes a wall member porous to the ionizable material and forming said outlet zone, and
said ion producing means includes a source of electrons directed onto said wall member.

22. An apparatus as defined in claim 21 wherein said source porous member is relatively long and narrow and curved providing a converging fan shaped beam,
said source of electrons comprise a strip emitter positioned on each side of said beam, and
said electrode means includes spaced members defining a beam exit slot.

23. An apparatus as defined in claim 22 including gate electrodes positioned on each side of said beam between said electron sources and said exit slot.

24. An apparatus as defined in claim 20 wherein said source enclosure includes a plurality of grids positioned and generally parallel to each other and spaced from the inner wall of said enclosure, and
means for connecting a high voltage source across said grids and enclosure for producing ions of said material.

25. An apparatus as defined in claim 24 wherein said source outlet zone of said enclosure is relatively long and narrow and curved providing a converging fan shaped beam, and
said electrode means includes spaced members providing a beam exit slot.

26. An apparatus as defined in claim 25 including gate electrodes positioned on each side of said beam between said enclosure and said exit slot.

27. An apparatus as defined in claim 20 wherein said control means includes means for producing particles from the source at a lower velocity at the start of a pulse and at a higher velocity at the end of the pulse for compressing the pulse as it travels from the source to the reaction space.

28. An apparatus as defined in claim 13 wherein each of said source includes means for producing a stream of positive ions, and an electron emitter for directing a stream of electrons along with the ions to form a combined beam.

29. An apparatus as defined in claim 28 wherein each of said sources includes means for producing said beam in a fan shape and not substantially more than one centimeter thick.

30. An apparatus as defined in claim 28 wherein each of said sources includes means for producing said beam in a circular cross section and not substantially more than one centimeter diameter.

31. An apparatus as defined in claim 28 wherein each of said sources includes:
a concave positive ion emitter; and
a plurality of grids spaced between said emitter and said electron emitter.

* * * * *